(12) United States Patent
Bas

(10) Patent No.: US 7,056,074 B2
(45) Date of Patent: Jun. 6, 2006

(54) CONNECTING ELEMENT AND JOINT

(76) Inventor: Allan Bas, Slättervägen 14, SE-824 40, Hudiksvall (SE)

( * ) Notice: Subject to any disclaimer, the term of this patent is extended or adjusted under 35 U.S.C. 154(b) by 28 days.

(21) Appl. No.: 10/481,840

(22) PCT Filed: May 24, 2002

(86) PCT No.: PCT/SE02/01000

§ 371 (c)(1),
(2), (4) Date: Feb. 5, 2004

(87) PCT Pub. No.: WO03/004884

PCT Pub. Date: Jan. 16, 2003

(65) Prior Publication Data

US 2004/0234355 A1    Nov. 25, 2004

(30) Foreign Application Priority Data

Jul. 6, 2001 (SE) .................................... 0102429

(51) Int. Cl.
*F16B 39/24* (2006.01)

(52) U.S. Cl. .................... 411/160; 411/166; 411/458; 411/460; 411/163; 411/164

(58) Field of Classification Search ............. 411/160, 411/162–164, 458–460, 166, 461, 161
See application file for complete search history.

(56) References Cited

U.S. PATENT DOCUMENTS

| | | | | |
|---|---|---|---|---|
| 1,426,232 A | * | 8/1922 | Theodorsen | ................ 403/283 |
| 2,230,392 A | | 2/1941 | Storms | |
| 2,558,132 A | * | 6/1951 | Green | ........................ 411/460 |
| 2,619,146 A | * | 11/1952 | Poupitch | ..................... 411/134 |

(Continued)

FOREIGN PATENT DOCUMENTS

| | | |
|---|---|---|
| CH | 314864 | 8/1956 |
| DE | 466 469 | 9/1928 |
| DE | 1 061 571 | 10/1956 |
| DE | 2015 201 | 10/1970 |
| GB | 824990 | 12/1959 |
| GB | 2 113 343 | 8/1983 |

(Continued)

OTHER PUBLICATIONS

Koytcheff, John M., translation of Nederland 11008, 4 pages plus 6 pages of foreigh patent document and annotations.*

*Primary Examiner*—Katherine Mitchell
(74) *Attorney, Agent, or Firm*—Buchanan Ingersoll PC

(57) ABSTRACT

A connecting element is adapted to be placed between two pieces of wood to be joined and includes a body with two opposite main surfaces and with an engaging device which protrude from each main surface. In addition, a joint comprises a connecting device which is adapted to be passed through the pieces of wood and the connecting element and apply a compressing force on the pieces of wood in such a manner that the engaging device of the intermediate connecting element penetrates into opposite wood surfaces. The connecting element comprises a through hole perpendicular to the main surfaces for passing through the shank-shaped connecting device. The hole exhibits engaging formations around its circumference, and the connecting device exhibits matching engaging formations on its shank part in such a manner that longitudinal displacement is allowed while rotary motion of the connecting device relative to the connecting element is prevented.

7 Claims, 3 Drawing Sheets

U.S. PATENT DOCUMENTS

Figure 1:
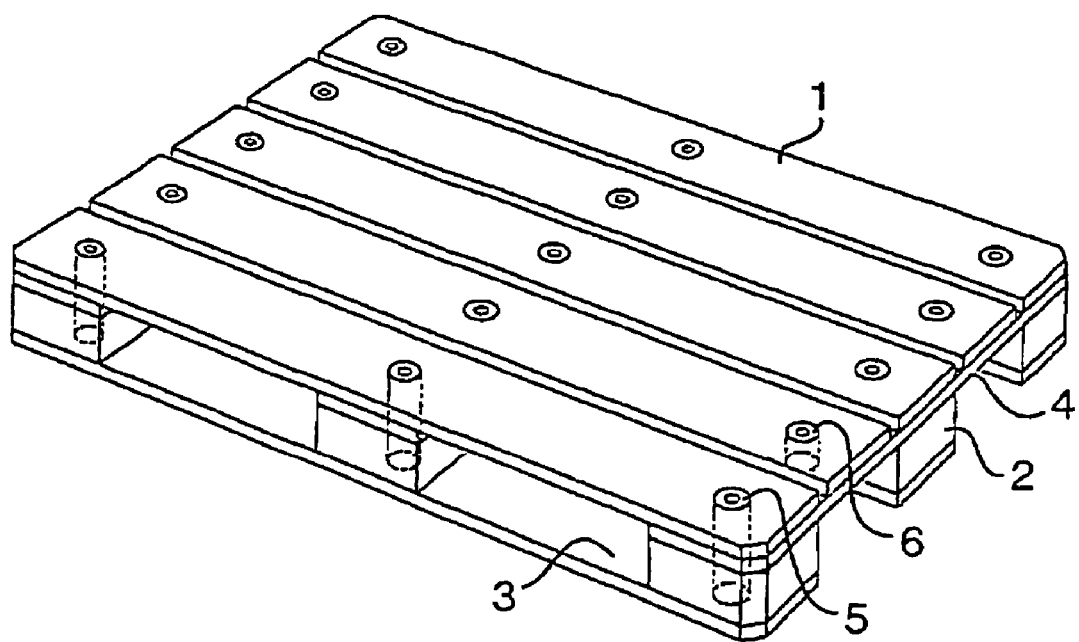

| | | | | |
|---|---|---|---|---|
| 2,675,844 A | * | 4/1954 | Knohl | 411/155 |
| 3,072,168 A | * | 1/1963 | Beart | 411/165 |
| 3,172,171 A | * | 3/1965 | Knight | 411/458 |
| 3,199,565 A | * | 8/1965 | Poupitch | 411/163 |
| 3,312,485 A | * | 4/1967 | Koenigshof | 403/11 |
| 5,628,599 A | * | 5/1997 | Eakin | 411/163 |

FOREIGN PATENT DOCUMENTS

| | | |
|---|---|---|
| GB | 2 322 425 | 8/1998 |
| NL | 11008 | 2/1924 |
| SE | 47639 | 10/1919 |
| SE | 511 140 | 5/1997 |

* cited by examiner

CONNECTING ELEMENT AND JOINT

The present invention relates to a connecting element for joining pieces of wood, comprising a body with two opposite main surfaces and with engaging means which protrude from each main surface, and the purpose of which, when placing the connecting element between two pieces of wood to be joined, is to penetrate into opposite wood surfaces and connect the pieces of wood with one another.

BACKGROUND ART

So-called nail plates are well known within the technique of joining different pieces of wood to one another. Such nail plates are usually made of a metal sheet which has a thickness of a few millimetres and in which flanges have been punched, which have been folded outwards so that they protrude from one main surface of the plate. The nail plates are used for joining in nodal points, where different pieces of wood meet in the same plane. In such joints, the main purpose is to absorb tensile stress in the longitudinal direction of the pieces of wood, and nail plates are well suited for this purpose.

It is already known from GB 2 322 425 that a joint and a pallet where two pallet elements not located in the same plane are connected surface against surface by a combination of a nail plate between the pallet elements and nails which are completely driven through at least one of the pallet elements, penetrate through the nail plate and a distance into the other pallet element. The purpose of the nail plate is in this case only to increase the shearing strength relative to a corresponding joint using only nails and not actually to connect the pallet elements with one another. However, in the same patent specification an alternative embodiment is disclosed where the punched-out flanges are folded outwards in opposite directions so that the flanges protrude from the two main surfaces of the plate. When placing such a nail plate between two pieces of wood, the nail plate, of course, also has a certain uniting effect on the pieces of wood, but the nail plate is in this case combined with through-nailing through both the nail plate and the pieces of wood. A common feature of all nail plates in this patent specification is that flanges are punched out from only certain portions of the plates, while others are left unperforated and reserved for the through nails. Such combined joints with nails as well as nail plates most likely obtain sufficient strength. However, it is time-consuming to produce them and once the pallet, or some other product that is connected in the same manner, is to be either discarded or mended, it is extremely difficult to dismantle them. When discarding, the parts included should as a rule for environmental reasons be divided into wood material for burning and metal for recycling, and it may be difficult to make this separation with a reasonable time expenditure since nails and nail plates can be wedged very tightly in one another. When mending and replacing separate parts of a pallet, it may for the same reasons be difficult to separate the parts without also breaking the parts that are to be kept. Naturally, also the total perforation of the pieces of wood on the one hand by conventional nails and, on the other, by the spikes of the nail plates increases the risk of the wood material already cracking during the joining.

BRIEF SUMMARY OF THE INVENTION

An object of the present invention is to eliminate the disadvantages of prior-art wood joints of the type mentioned by way of introduction and create a connecting element which allows easy and fast connection of two pieces of wood located in different planes with especially great shearing strength and torsional strength, and easy and quick dismounting of the pieces of wood with the purpose of discarding or mending. At least these objects are achieved by means of a connecting element as claimed in claim 1.

The invention also relates to a joint mainly having the same objects as mentioned above. These objects are achieved by means of a joint as claimed in claim 4.

The invention is thus based on the understanding that an efficient and appropriate connecting element is obtained by forming on two opposite main surfaces of the element protruding engaging means and forming, in a through hole perpendicular to the main surfaces, for a shank-shaped connecting means, engaging formations in the form of, for example, grooves, ridges or projections. By means of such a connecting element, an efficient and appropriate joint is obtained by placing the element between two wood surfaces which are to be connected, and by passing through a shank-shaped connecting means which exhibits engaging formations matching the engaging formations of the connecting element, which allows longitudinal displacement but prevents rotary motion of the connecting element relative to the connecting means. The purpose of the shank-shaped connecting means is to pull the pieces of wood towards one another in such a manner that the protruding engaging means of the intermediate connecting element penetrate into the opposite wood surfaces, and can, for example, be a bolt having a screw-threaded nut and grooves formed on the shank of the bolt. However, the shank-shaped connecting means can be of the type shown in SE 511 140, which is particularly suited to easily and dismountably join pallets. In the following detailed description of a preferred embodiment of the invention, the connecting element and a joint according to the invention are shown and described by using a connecting means according to said patent specification.

By placing a connecting element according to the invention between two pieces of wood and with the aid of a shank-shaped connecting means applying a force that presses the pieces of wood together, the protruding engaging means on the respective main surfaces of the connecting element will penetrate into the corresponding wood surfaces and give improved torsional strength between the pieces of wood. By forming the hole in the connecting element and the shark of the connecting means with engaging formations matching one another and allowing longitudinal displacement of the connecting means through the hole but preventing rotation between the same, the rotation-preventing action is further improved. Various combinations of engaging formations are possible within the scope of the invention, for instance, ridges or projections on the shank of the connecting means in combination with grooves or recesses in the hole of the connecting element. The opposite is also conceivable, i.e. longitudinal grooves in the shank of the connecting element and ridges or projections in the hole of the connecting element.

The invention is applicable in all joints where two or more pieces of wood are to be joined surface against surface in different planes. The received manner so far when it comes to providing a rotation-preventing action between the pieces of wood in such a joint is to join the pieces of wood with at least two but, if possible, more connecting means in the form of, for example, nails, screws, bolts and the like which are arranged at a distance from one another across a surface as large as possible. However, this is time-consuming and increases the risk of cracking in the wood. By means of the present invention, it is thus possible to provide an excellent rotation-preventing action using only one connecting means in each joint. The advantages of this are many. For example, only one hole needs to be drilled and both mounting and dismounting are easily and quickly carried out.

According to a preferred embodiment, the connecting element and the joint according to the invention are used when joining pallets in order to provide pallets having high stability without any tendency of getting warped but being easy and quick to mount and dismount for discarding and/or replacing damaged parts.

In a preferred embodiment, the connecting element is made of plastics, e.g. polypropylene, the protruding engaging means suitably being formed directly when injection moulding the element. However, it should, of course, be possible to make the connecting element of metal, e.g. by punching out flanges in a plate, the flanges being bent outwards to each side in order to form the engaging means. One advantage of making the connecting element of plastics is that, when discarding wood products, such as pallets, the product can directly be chipped without any previous dismounting and removal of metal parts. The shank-shaped element means according to said SE 511 140 is in a preferred embodiment also made of plastics.

In a preferred embodiment, the connecting element is further formed as a thin plate with a circular outer shape. The body of the connecting element is plate-shaped and has a thickness which essentially is smaller than its largest width and, in particular, the thickness is no more than 10%, preferably no more than 7% and most preferably no more than 4% of the width. However, the invention is not limited to this embodiment but could, for example, have a square or some other outer shape. In addition, the connecting element does not need to be flat or thin but could have a considerable thickness. For example, in pallets there are distance elements for joining a bottom deckboard and a cross piece at a distance from one another. This distance element could be formed as a connecting element according to the present invention with protruding engaging means on the respective main surfaces.

It should be understood that the term piece of wood comprises all types of wood-based construction material, such as homogeneous timber, laminate, wood particle boards, OSB boards, plywood, fibre boards and the like. It would also be possible to join different plastic material by means of a connecting element and a joint according to the invention.

BRIEF DESCRIPTION OF THE ACCOMPANYING DRAWINGS

Figure 2:
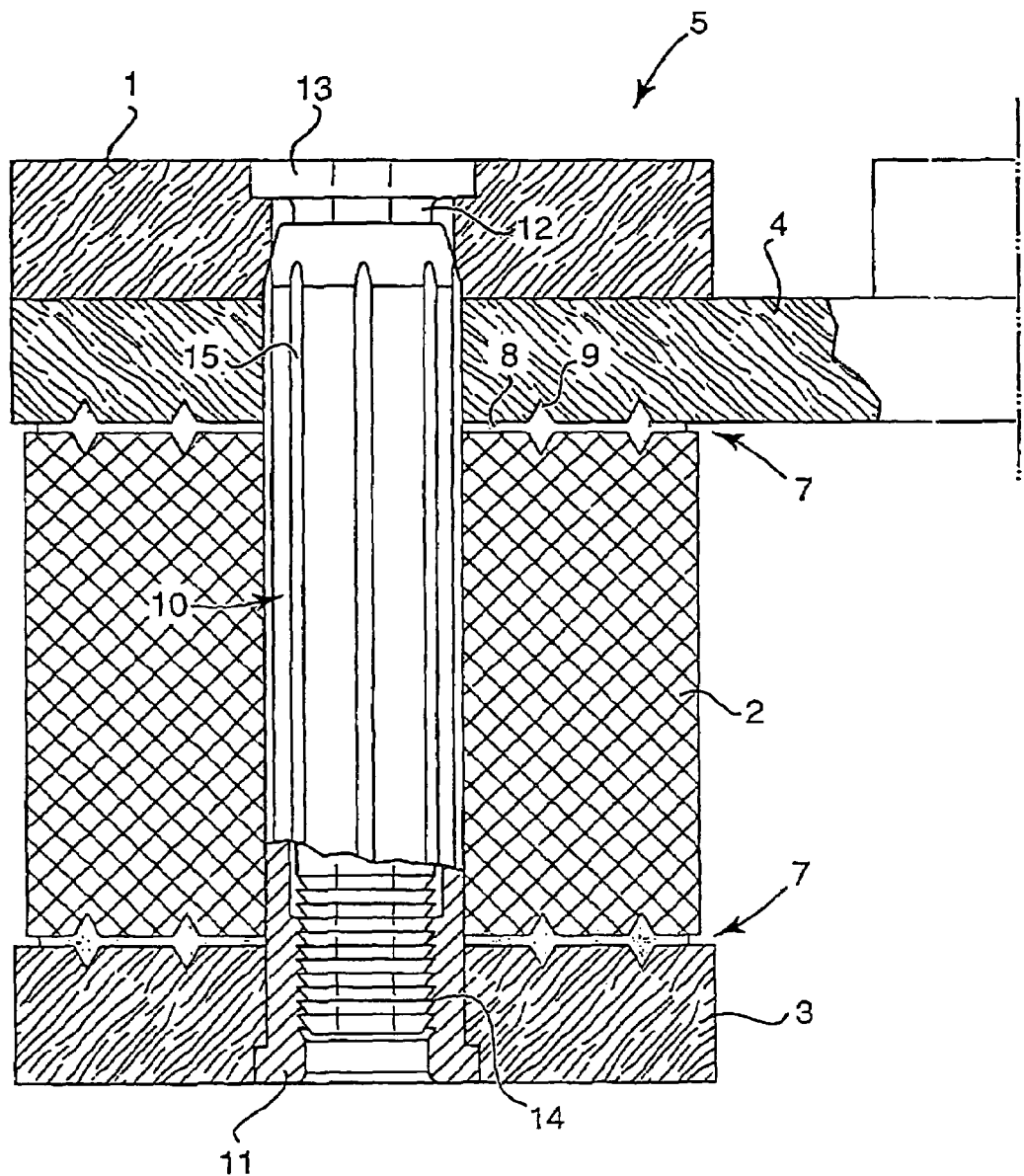
Figure 3:
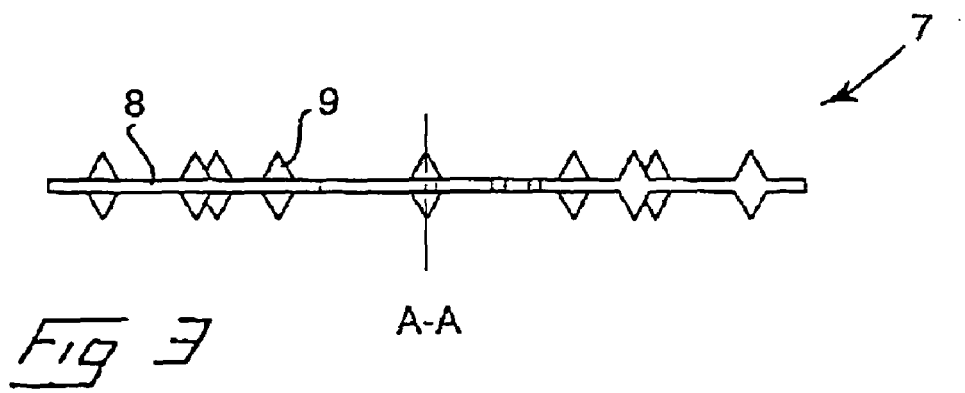
Figure 4:
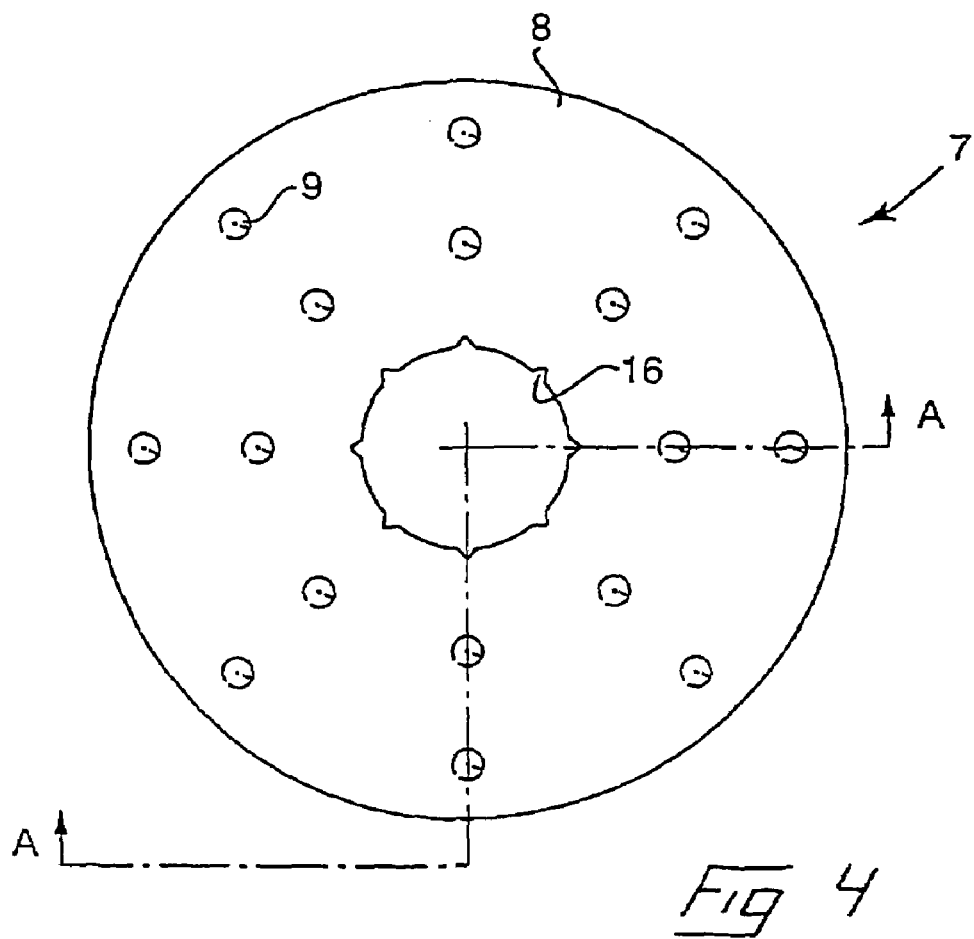

In the drawings
FIG. 1 is a perspective view of a conventional pallet, in which the present invention is applicable for connecting its nodal points,
FIG. 2 is a cross-section through one of the nodal points in the pallet according to FIG. 1,
FIG. 3 is a cross-section along the line A—A in FIG. 4 of a connecting element according to the invention, and
FIG. 4 is a top view of the connecting element in FIG. 3.

DETAILED DESCRIPTION OF A PREFERRED EMBODIMENT OF THE INVENTION

First reference is made to FIG. 1 which shows a pallet of previously known, conventional type. The pallet exhibits a loading deck in the form of parallel top deckboards 1, distance elements 2, a bottom part in the form of bottom deckboards 3, and cross pieces 4 which are positioned between the top deckboards and the distance elements and extend perpendicular to the top deckboards and the bottom deckboards. In this embodiment, the pallet has fifteen nodal points where pieces of wood in different planes are to be joined surface against surface. The nodal points are of two types, on the one hand, nodal points 5 where top deckboards 1, cross pieces 4, distance elements 2 and bottom deckboards 3 are to be joined and, on the other, nodal points 6 where only top deckboards 1 and cross pieces 4 are joined.

Subsequently, reference is made to FIG. 2 which shows a cross-section through a nodal point 5 according to FIG. 1, the nodal point being formed with a joint according to the present invention. The parts which are included in the pallet are, counting from above, a top deckboard 1, a cross piece 4, a distance element 2 and a bottom deckboard 3. A connecting element 7 is positioned between the cross piece 4 and the distance element 2 and between the distance element 2 and the bottom deckboard 3, respectively. This is made with a body 8 in the form of a plate or a sheet which on each main surface exhibits protruding engaging means 9.

In order to press the parts of the pallet together, which are included in the nodal point, a connecting means known from SE 521 540 is used in the shown embodiment and comprises, on the one hand, a shank-shaped female port 10 with a flanged portion or head 11 at its one end and, on the other, a shank-shaped male part 12 which also is formed with a flanged portion or head 13 at one of its ends and which is insertable into a bore in the female part from its end which is not provided with a head. The male part is engagable with the female part through grooves or flutes 14 on the shank of the male part which engage with corresponding flutes in the bore of the female part. The outside of the shank of the female part is formed with a plurality of ridges 15 extending in its axial direction.

When mounting, all parts included have to be pre-drilled so that the female part and male part of the connecting means can be inserted into the pre-drilled hole from one direction each and, subsequently, the male part is pressed into the female part as far as possible, whereby also the parts included in the pallet will be pressed together and the protruding engaging means 9 of the connecting elements 7 will penetrate into the wood material on each side of the connecting element.

The pre-drilled hole should have a diameter corresponding to the shank of the female part but somewhat smaller than the maximum diameter between two opposite ridges 15. These will thus somewhat penetrate into the wood material and give increased torsional rigidity.

FIG. 4 shows that the inner circumference of the hole through the connecting element 7 is formed with a plurality of recesses 16, the diameter of the hole and the number, shape, size and position of the recesses corresponding to the diameter of the shank of the female part and the number, shape, size of the ridges 15 in such a manner that the female part can be longitudinally displaced through the connecting element 7 but rotation is prevented by the ridges 15 and recesses 16 engaging in one another. The torsional rigidity of the joint is thus further increased.

FIGS. 3 and 4 show that the connecting element 7 in the preferred embodiment is formed as a flat, thin, circular disc and the protruding engaging means 9 are conically pointed and circular seen in planes. As mentioned previously, the connecting element could, however, be designed in many different ways. In an alternative embodiment, the actual connecting element could, for example, constitute distance elements in a pallet of the type described above. The connecting element 7 would thus have the same thickness as the distance element 2 in FIGS. 1 and 2 with engaging means 9 protruding from each main surface thereof.

The invention claimed is:

1. A joint for joining pieces of wood, comprising:
   a connecting element which is adapted to be positioned between two pieces of wood to be connected and which exhibits a body with two opposite main surfaces and with engaging means protruding from each main surface, and
   a shank-shaped connecting means which is adapted to be passed through holes in the pieces of wood and the connecting element and apply a compressing force on the pieces of wood in such a manner that the engaging means of the intermediate connecting element penetrate into the opposite wood surfaces,
   wherein the connecting element comprises a through hole perpendicular to the main surfaces for passing through the shank-shaped connecting means, the hole exhibiting engaging formations around its circumference, and the shank-shaped connecting means exhibits matching engaging formations on its shank part in such a manner that longitudinal displacement is allowed while rotary motion of the shank-shaped connecting means relative to the connecting element is prevented.

2. The joint as claimed in claim 1, wherein the body of the connecting element is plate-shaped and has a thickness that is essentially smaller that its largest width and, the thickness is no more than 10% of the width.

3. The joint of claim 2, wherein the connecting element made of plastic.

4. The joint of claim 1, wherein connecting element is made of plastic.

5. A joint as claimed in claim 1, wherein the engaging formations of the connecting element have the shape of grooves or recesses while the engaging formations of the connecting means have the shape of ridges or projections.

6. The joint as claimed in claim 1, wherein the body of the connecting element is plate-shaped and has a thickness that is essentially smaller than its largest width and the thickness is no more than 7% of the width.

7. The joint as claimed in claim 1, wherein the body of the connecting element is plate-shaped and has a thickness that is essentially smaller than its largest width and the thickness is not more than 4% of the width.

* * * * *